United States Patent

[11] 3,628,177

[72] Inventor Jacob M. Hammer
 Lawrence Township, Mercer County, N.J.
[21] Appl. No. 468,078
[22] Filed June 29, 1965
[45] Patented Dec. 14, 1971
[73] Assignee RCA Corporation

[54] OPTICAL MODULATION SYSTEM
 8 Claims, 3 Drawing Figs.

[52] U.S. Cl. ..................................................... 331/94.5
[51] Int. Cl. ..................................................... H01s 3/10
[50] Field of Search .......................................... 331/94.5;
 332/7.51; 350/160

[56] References Cited
UNITED STATES PATENTS
3,321,714 5/1967 Tien ............................. 331/94.5

Primary Examiner—William L. Sikes
Attorney—Edward J. Norton

ABSTRACT: Intensity, color and/or spatial modulation of a laser light beam is accomplished by providing within the resonant cavity of a gas laser, pump means for the gas which comprises at least in part an electron beam, in which the electron beam current, electron beam voltage and electron beam position are independently controllable by means of a first grid between a cathode and anode, a second grid between the first grid and the anode, and deflection plates, respectively.

Patented Dec. 14, 1971

INVENTOR.
JACOB M. HAMMER
BY Edward J. Norton
Attorney

INVENTOR.
JACOB M. HAMMER
BY
Edward J Norton
Attorney

OPTICAL MODULATION SYSTEM

This invention relates to light generation systems and particularly to improved intensity, color and spatial modulation systems for lasers.

Many of the potential applications of lasers require that a laser beam be modulated in intensity, color or in spatial position.

It is therefore an object of the present invention to provide novel techniques for modulating a laser beam in intensity, color and spatial position.

It is a further object of the present invention to provide a novel system for selectively exciting a gas laser to produce different colors.

A further object of the present invention is to provide a novel means for spatially positioning a laser beam.

These and other objects are accomplished in the present invention by utilizing two exciting sources for the laser, at least one of which is an electron beam whose current, voltage, and/or position are easily controlled. In one embodiment of the present invention, a gas laser is excited by the combination of a conventional laser exciting source, such as a DC discharge, and an easily controlled electron beam. Control of the electron beam current permits intensity modulation and control of the beam voltage permits selective excitation of different energy levels. Therefore the laser beam may be modulated in intensity and in color. In a second embodiment of the present invention, the electron beam position, as well as its current and voltage, are controlled to permit control of the laser beam position. In a third embodiment of the present invention, two intersecting electron beams, with or without an additional exciting source, are used to excite a gas to a lasing condition. Laser action is obtained at the intersection of the two electron beams. The third embodiment provides two dimensional displacement of the laser beam.

Three embodiments of the invention will be described with reference to the accompanying drawing in which.

Figure 1:
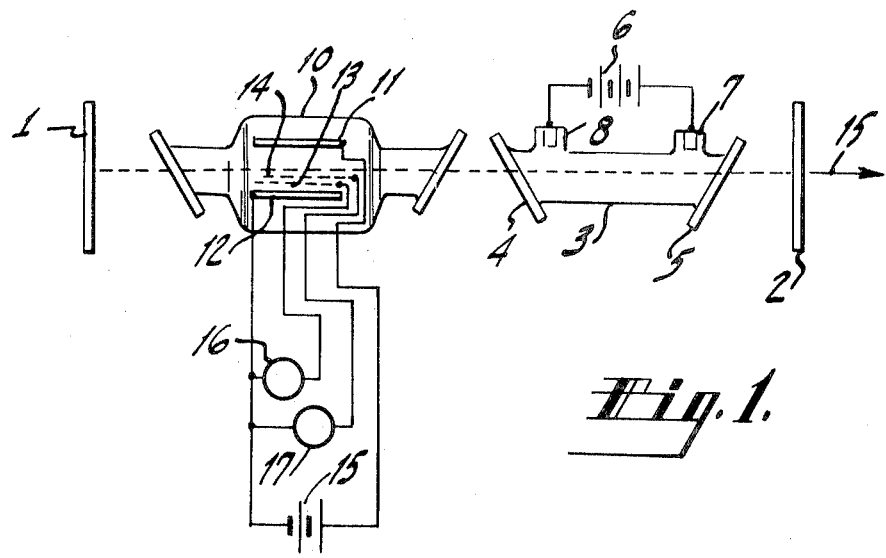
FIG. 1 is a side view of one embodiment of the present invention.

FIG. 1 is a diagram of a first embodiment of the present invention. Two gas-filled tubes 3 and 10 are placed within a resonant cavity defined by two reflectors 1 and 2, the second reflector 2 being partially transparent to establish the output beam 15. One of the tubes 3 is a conventional hot cathode discharge tube fitted with brewster's angle windows 4 and 5. A source of DC voltage 6 is connected between the anode 7 and the cathode 8 of the discharge tube 3. The tube 3 can be filled with any gas or mixture of gases capable of lasing. Specific examples of suitable gases are Argon (Ar) and Krypton (Kr). While a gas discharge tube has been illustrated, in general, any conventional laser tube, with any conventional pumping scheme, may be used. Also, while brewster's angle windows have been shown, they are not required.

The second tube 10 is positioned in the cavity in line with the first tube 3 and contains the same gas as the latter. The gas pressure in both tubes 3 and 10 is best determined empirically for each tube by conventional techniques. In most cases the pressure will be between 0.05 and 0.50 millimeters of mercury. Fitted within the tube 10 is an electron beam forming structure including a plate 11, a cathode 12, a first grid 13, and a second grid 14. The arrangement of cathode, grids, and plate is capable of forming an electron beam to excite the gas in a region in line with a corresponding region of the tube 3, in other words along the axis of the laser. A suitable beam-forming structure is that of a 6Y6 pentode with the second grid held at a more positive voltage than the first grid and both the beam forming electrode and the plate held at a negative value. For simplicity of description, however, the grid structure illustrated in FIG. 1 is that of a tetrode. A conventional biasing circuit for the tube 10 includes a DC source 15, a first signal source 16 for controlling the current of the electron beam and a second signal source 17 for controlling the voltage of the electron beam.

While two separate tubes 3 and 10 are illustrated, a single tube containing both the electron beam generating means and a second energizing means, e.g. a DC discharge device, may be used.

In the operation of the embodiment of FIG. 1, most of the power required to operate the laser is supplied from the source 6 while a relatively small amount of power is used to control the laser through the electron beam structure of the second tube 10. The electron beam formed in the tube 10 interacts with and excites the gas within the tube 10 to establish the desired laser operation. Both intensity and color may be controlled by the electron beam. The laser beam intensity is controlled by controlling the electron beam current with the source 16. Laser color is controlled by controlling the electron beam voltage with the source 17. The population inversion of the gas in the tube 3 is brought to a point just below or just above threshold by the source 6. Where less than threshold is established the electron beam voltage and current are adjusted to increase the population inversion at the desired frequency (color) to the threshold point.

Electron beam voltage, which is directly related to electron energy, is used to control the laser beam color because the beam color is determined by the particular atomic states of the gas which are excited by the electron beam. The probability of exciting a given atomic state is a function of the electron energy, the probability being greatest at an electron energy which is about twice the energy difference between the states excited.

Electron beam current is used to control the laser beam intensity because the beam current will control the total number of electron-atom collisions and thus the magnitude of the resulting population inversion. It should be noted that some control of laser beam intensity may be accomplished by controlling electron beam voltage, but electron beam current control permits greater control of laser intensity.

Where a population inversion greater than threshold is established in the tube 3 then laser action will be obtained without any energy supplied from the electron beam. The electron beam may then be adjusted to place the gas in the second tube 10 in an absorbing condition to decrease the beam intensity or to stop lasing. For example, at appropriate beam currents and voltages the lower laser states may be preferentially populated in the second tube 10. Absorption of the laser transitions terminating on the preferentially populated states will then occur.

Figure 2:
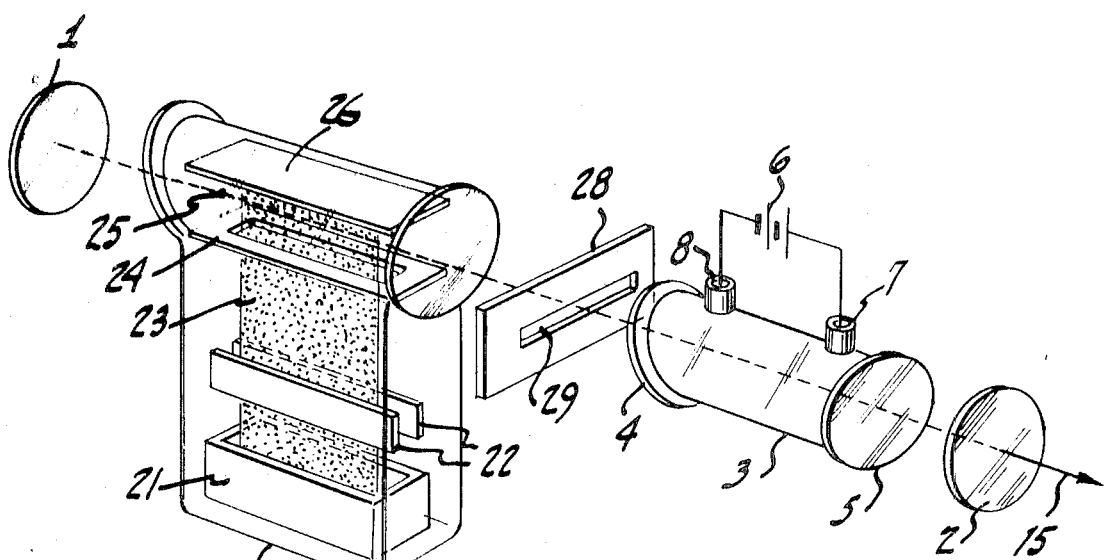
FIG. 2 is a pictorial representation of a second embodiment of the present invention.

In addition to controlling the intensity and color of the laser, an electron beam may be used to control laser beam position. FIG. 2 is an embodiment of the present invention where one dimensional control of the laser beam is achieved. In FIG. 2 the tube 20 has replaced the tube 10 of FIG. 1. The remaining elements shown in FIG. 2 are essentially the same as those of FIG. 1 and corresponding numerals have been used to designate the corresponding elements. The control tube 20 is constructed to permit control of the voltage, current, and position of the electron beam. The tube 20 includes an electron gun 21 of conventional construction which includes a current modulation structure and suitable focusing devices. A pair of conventional deflection plates 22, across which a position control voltage is established, controls the position of the electron beam 23. A voltage defining electrode 24 controls the voltage of the electron beam in the region of the laser beam 25. An electron beam collector 26 is placed just above the position of the laser beam 25. For the sake of clarity, circuit connections to the various elements of the tube 20 have been omitted. Such connections can be made in the conventional manner. A mask 28 with a slit 29 is positioned in the laser cavity to limit the laser beam diameter.

The operation of the embodiment of FIG. 2 is similar to that of FIG. 1 embodiment with respect to intensity and color control. Again, Argon and Krypton, as well as any other lasing gases, are suitable. In the embodiment of FIG. 2 however, the position of the laser beam may be controlled by controlling the position of the electron beam 23. Thus, positioning of the laser beam is controlled by a voltage across the deflection plates 22. The intensity and color of the laser beam are controlled by varying the electron current and electron voltage in the vicinity of the laser beam by the electrode 24.

Figure 3:
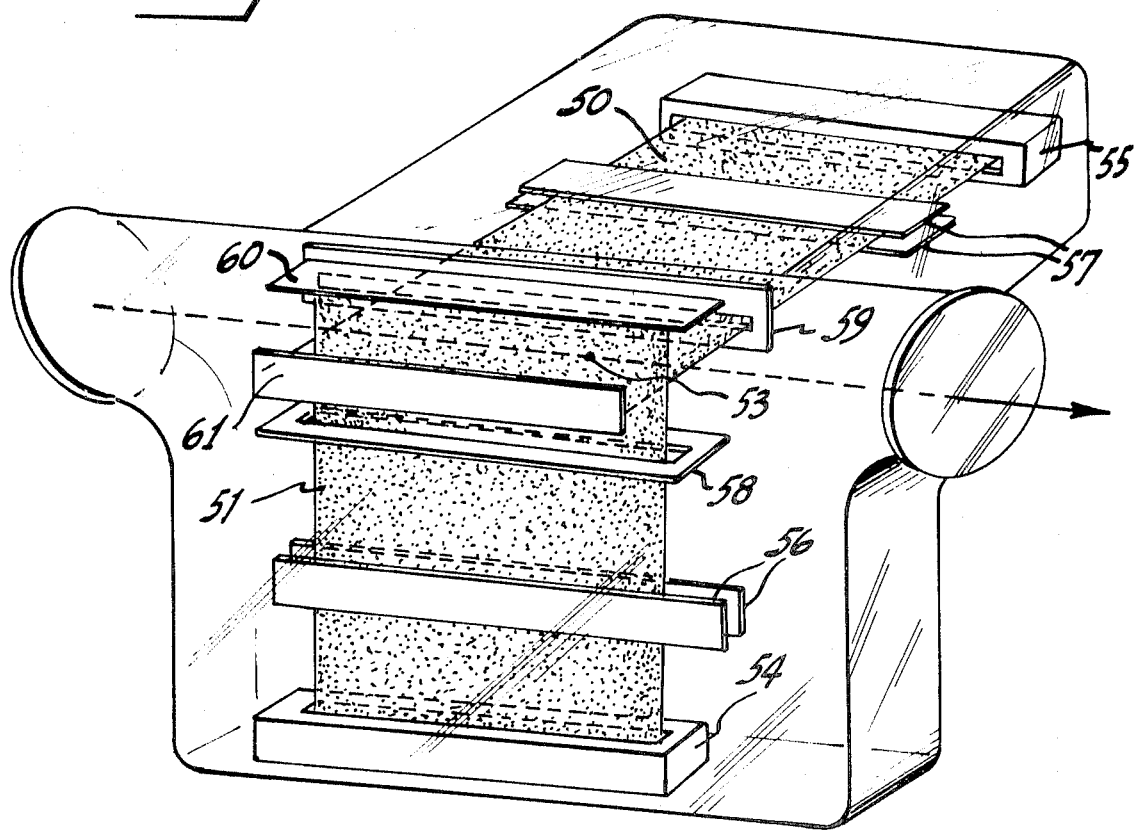
FIG. 3 is a pictorial representation of a third embodiment of the present invention.

FIG. 3 is a diagram of a control tube which may be employed in a manner similar to the control tubes 10 of FIG. 1 and 20 of FIG. 20 but which allows a two dimensional movement of the laser beam. In the embodiment of FIG. 3 two electron beams 50 and 51 intersect along a line 53. The means employed to establish the two electron beams 50 and 51 are similar to the means used to establish the electron beam in the embodiment of FIG. 2. These means include the two electron guns 54 and 55, the two sets of deflecting plates 56 and 57, the two voltage defining electrodes 58 and 59, and the two electron beam collectors 60 and 61.

In the operation of the embodiment of FIG. 3 the position of the laser beam along the line 53 is controlled in a first dimension by controlling the voltage applied across the deflection plates 56 and in a second dimension by controlling the voltage across the deflection plates 57. As in the embodiment of FIG. 2, the intensity and color of the laser beam are controlled by controlling the total current and voltage at the laser beam position, here at the intersection of the two electron beams.

Either of the embodiments of FIG. 2 and 3 may be constructed to operate with the two exciting sources, i.e. the electron beam and DC discharge, or the electron beam may be used alone provided sufficient electron energy is available.

In the embodiments of FIGS. 2 and 3, the electron beam is displaced linearly in one and two dimensions respectively. It should be noted, however, that any type of electron beam displacement may be incorporated into the present invention by providing suitable electric and magnetic displacing means. For example, the electron beam can be made to rotate about an axis perpendicular to the laser beam axis thus enabling rotation of the laser beam.

What is claimed is:
1. In combination
   a. a resonant cavity,
   b. a gas capable of lasing contained within said cavity,
   c. means for exciting the gas contained within said cavity for establishing a population inversion which is just below threshold over a relatively wide area,
   d. means for establishing an electron beam having a relatively narrow cross section with respect to said wide area to excite the gas contained within said cavity for increasing the population inversion above threshold solely for that portion of said gas which is in cooperative relationship with said electron beam,
   e. means for controlling the current and voltage of said electron beam, and
   f. means for controlling the position of said electron beam with respect to said wide area,
2. In combination
   a. a resonant cavity,
   b. a first tube filled with gas capable of lasing contained within said cavity,
   c. means for exciting the gas contained within said tube for establishing a population inversion which is just below threshold over a relatively wide area,
   d. a second tube filled with gas capable of lasing contained within said cavity,
   e. means for establishing an electron beam having a relatively narrow cross section with respect to said wide area in said second tube to excite the gas contained within said second tube for increasing the population inversion above threshold solely for that portion of said gas which is in cooperative relationship with said electron beam,
   f. means for controlling the current and voltage of said electron beam, and
   g. means for controlling the position of said electron beam with respect to said wide area.

3. In combination
   a. a resonant cavity,
   b. a gas capable of lasing and having relatively wide orthogonal cross sectional dimensions contained within said cavity,
   c. means for establishing a first electron beam having a relatively narrow cross section with respect to one of said orthogonal dimensions within said cavity which in itself increases the population inversion for that portion of said gas in cooperative relationship therewith to a point below threshold,
   d. means for establishing a second electron beam having a relatively narrow cross section with respect to the other of said orthogonal dimensions within said cavity which in itself increases the population inversion for that portion of said gas in cooperative relationship therewith to a point below threshold,
   e. said first and second electron beams intersecting along a line, said population inversion exceeding said threshold solely along said line,
   f. means for controlling the energy of said first electron beam,
   g. means for controlling the position of said first electron beam with respect to said one of said orthogonal dimensions,
   h. means for controlling the voltage and current of said second electron beam, and
   i. means for controlling the position of said second electron beam with respect to said other of said orthogonal dimensions.

4. The combination of, a resonant cavity, a gas capable of lasing and having relatively wide orthogonal cross-sectional dimensions contained within said cavity, first and second exciting means for exciting the gas contained within said cavity, at least one of said exciting means comprising;
   a. means for establishing a first electron beam having a relatively narrow cross section with respect to one of said orthogonal dimensions within said cavity which in itself increases the population inversion for that portion of said gas in cooperative relationship therewith to a point below threshold,
   b. means for establishing a second electron beam having a relatively narrow cross section with respect to the other of said orthogonal dimensions within said cavity which in itself increases the population inversion for that portion of said gas in cooperative relationship therewith to a point below threshold,
   c. said first and second electron beams intersecting along a line said population inversion exceeding said threshold solely along said line,
   d. means for controlling the energy of said first electron beam,
   e. means for controlling the position of said first electron beam with respect to said one of said orthogonal dimensions,
   f. means for controlling the current and voltage of said second electron beam, and
   g. means for controlling the position of said second electron beam with respect to said other of said orthogonal dimensions.

5. In combination
   a. a resonant cavity,
   b. a first tube filled with gas capable of lasing and having relatively wide orthogonal cross-sectional dimensions positioned within said cavity,
   c. means for exciting the gas contained within said tube,
   d. a second tube filled with gas capable of lasing and having relatively wide orthogonal cross-sectional dimensions contained within said cavity,
   e. means for establishing first and second intersecting electron beams within said second tube for exciting the gas contained within said second tube at the intersection of said electron beam to increase the population inversion of said gas within said second tube above threshold solely along said intersection of said electron beams, and f. means for controlling the position of said first and second electron beams with respect to said orthogonal cross-sectional dimension.

6. In combination
   a. a resonant cavity,
   b. a first tube filled with gas capable of lasing and having relatively wide orthogonal cross-sectional dimensions positioned within said cavity,
   c. means for exciting the gas contained within said tube,
   d. a second tube filled with gas capable of lasing and having relatively wide orthogonal cross-sectional dimensions contained within said cavity,
   e. means for establishing first and second intersecting electron beams within said second tube for exciting the gas contained within said second tube at the intersection of said electron beams to increase the population inversion of said gas within said second tube above threshold solely along said intersection of said electron beams, and
   f. means for controlling the position with respect to said orthogonal cross-sectional dimensions, current, and voltage of said first and second electron beams.

7. A light modulating system comprising, in combination, an optical maser comprising an elongated member containing an active medium and a pair of means external to said member forming an optical cavity resonator, a gas-filled elongated electron tube between one end of said member and one of said means, the longitudinal axis of said electron tube being coextensive with a longitudinal axis of said member, said electron tube having cathode, anode, and first and second grid electrodes parallel to the longitudinal axis thereof, means for exciting said member to emit a beam of light, and means for applying respective voltages to said electrodes for varying both the absolute absorption properties of the gas for said beam and the relative absorption properties of the gas as a function of color of said beam, said last-named means including independent means for varying the voltage between said first grid and said cathode and means for varying the voltage between said second grid and said cathode.

8. A light modulating system comprising, in combination, an optical maser comprising an elongated member containing an active medium and a pair of mirrors at either end of said member forming a cavity resonator, a gas-filled elongated electron tube between one end of said member and one of said mirrors, the longitudinal axis of said electron gun being coextensive with the longitudinal axis of said member, said electron gun having an electron emissive cathode, anode and first and second grid electrodes parallel to the longitudinal axis thereof, and defining a space for passage of a light beam longitudinally through said tube, means for exciting said member to direct a beam of light through said tube, and means for varying both the amount and color of light passed through said tube comprising independent first and second means for respectively applying a first variable voltage between said first grid and cathode electrodes and a second variable voltage between said second grid and said cathode electrodes to vary both the absolute absorption properties of the gas and the relative absorption properties of the gas as a function of the color of light.

* * * * *